No. 808,662. PATENTED JAN. 2, 1906.
J. JOHNSON.
AUTOMATIC WATER SUPPLY SYSTEM.
APPLICATION FILED OCT. 22, 1904.
3 SHEETS—SHEET 2.
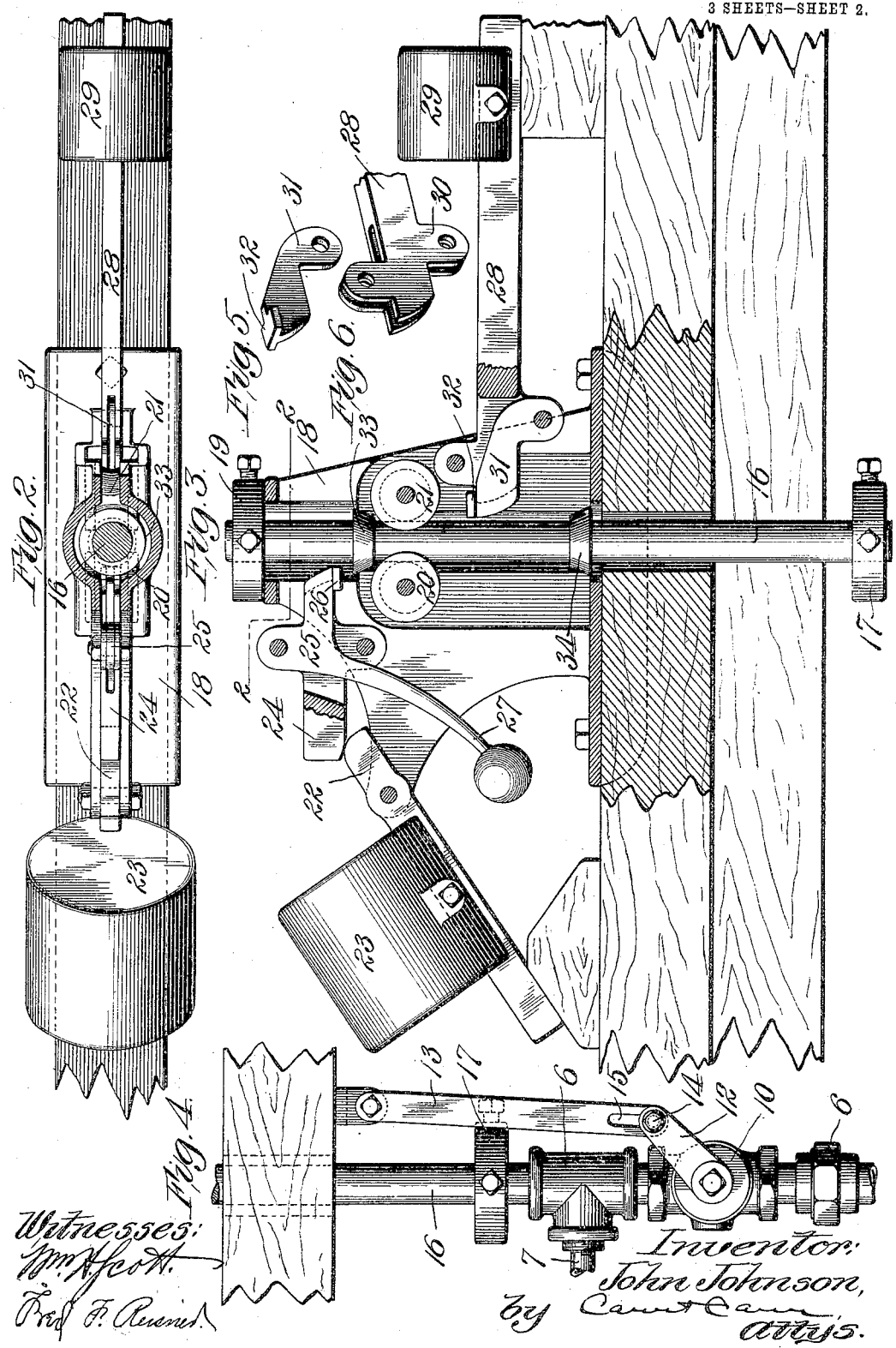
Witnesses:
Inventor:
John Johnson,
by ———— atty's.

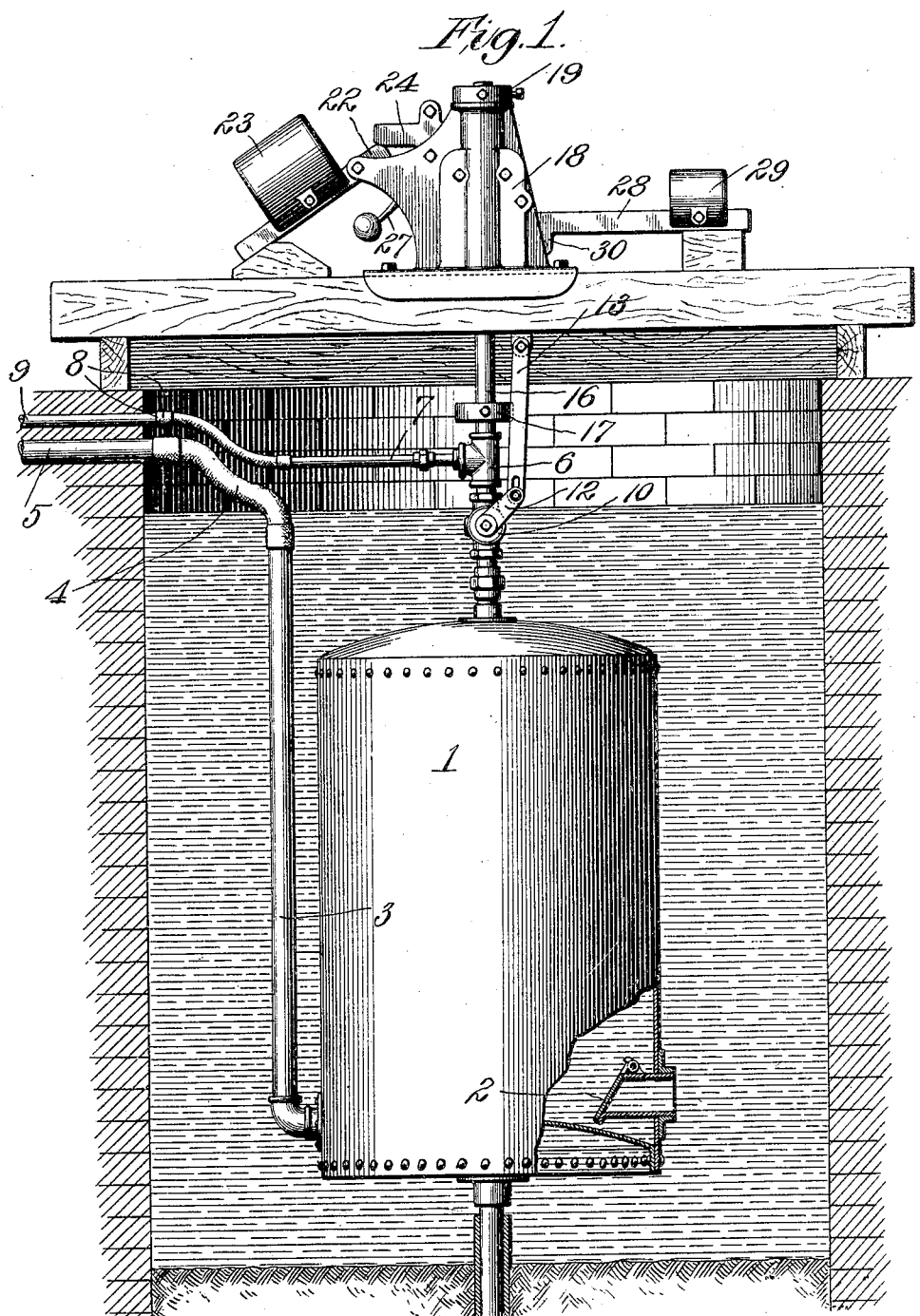

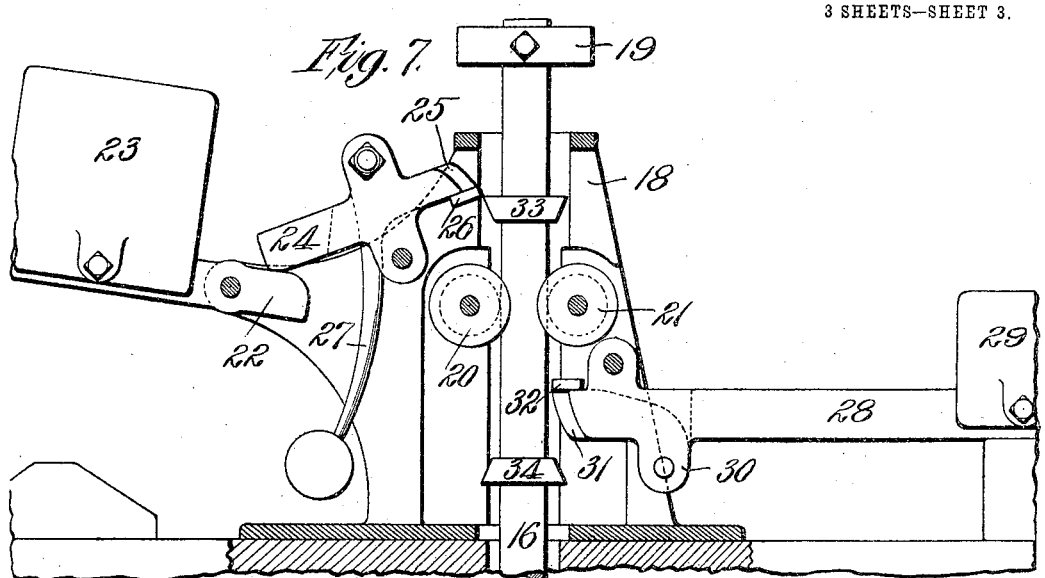
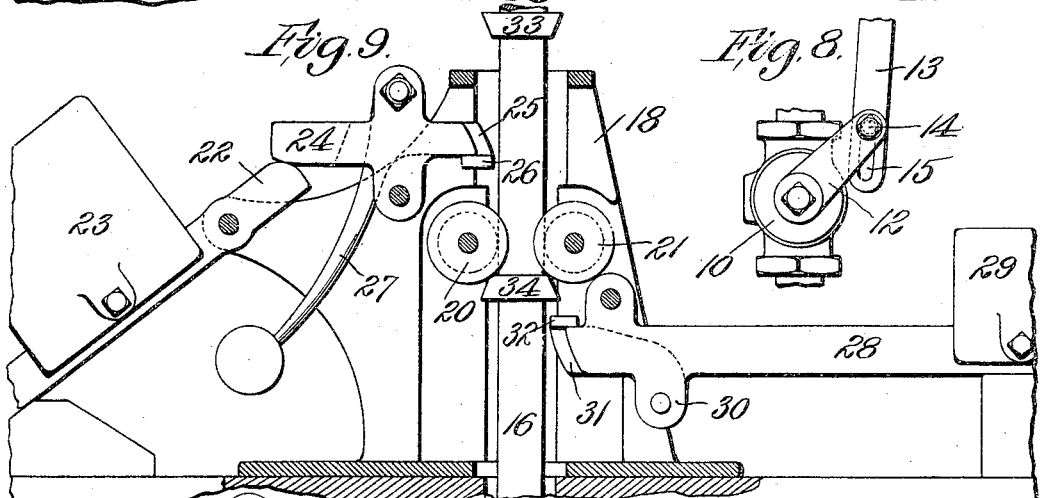
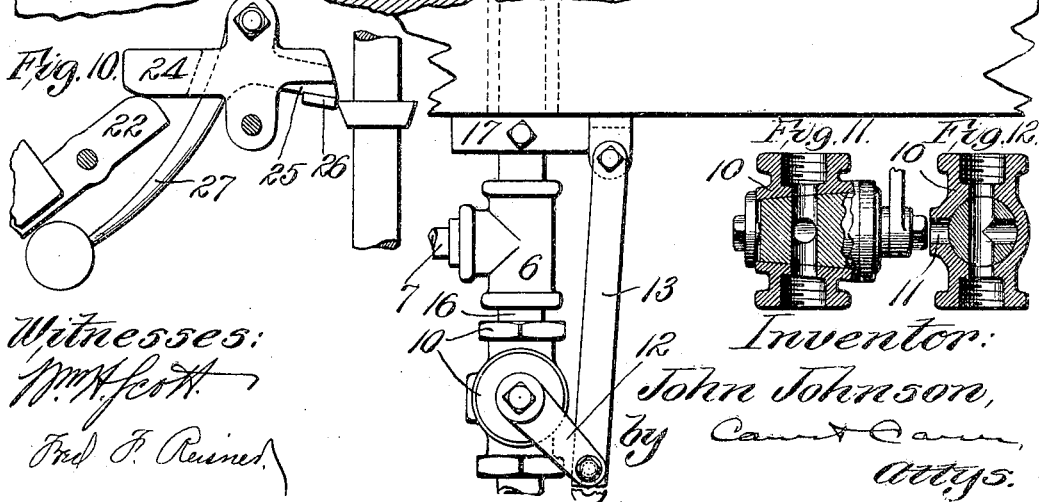

UNITED STATES PATENT OFFICE.

JOHN JOHNSON, OF OVERLAND PARK, MISSOURI, ASSIGNOR TO THE COUNTRY HYDRANT COMPANY, OF ST. LOUIS, MISSOURI, A CORPORATION OF MISSOURI.

AUTOMATIC WATER-SUPPLY SYSTEM.

No. 808,662.  Specification of Letters Patent.  Patented Jan. 2, 1906.

Application filed October 22, 1904. Serial No. 229,612.

*To all whom it may concern:*

Be it known that I, JOHN JOHNSON, a citizen of the United States, and a resident of Overland Park, county of St. Louis, and State of Missouri, have invented a new and useful Improvement in Automatic Water-Supply Systems.

My invention relates to systems of water-distribution employing submerged tanks and air-pressure, and especially to mechanism whereby the tank will be automatically refilled after having been emptied.

It has for its principal objects to automatically refill the tank after it has been emptied, to automatically apply the pressure to force the water out of the tank after it has been filled, to limit the range of movement of the tank, to cause the tank to move suddenly at the moment when it becomes substantially empty or substantially full, to suddenly turn the cock controlling the air-supply, and other objects hereinafter more fully appearing.

In the accompanying drawings, forming a part of this specification, and wherein like symbols refer to like parts wherever they occur, Figure 1 is a sectional view through a well or cistern, showing the mechanism in elevation, a portion of the tank being broken away to show the inlet-valve. Fig. 2 is a plan view of the control mechanism, a part of the figure being a section taken on the line 2 2 of Fig. 3. Fig. 3 is a sectional view of the control mechanism. Fig. 4 is a view of the valve and its operating-link, this view being practically a continuation below the platform of the parts shown in Fig. 3. Figs. 5 and 6 are views of the dog and lever, respectively, separated from each other, which control the descent of the tank. Fig. 7 is a diagrammatic view of the control mechanism at the moment when the tank is released for its sudden upward movement. Fig. 8 is a diagrammatic view of the valve and its operating-link at the moment when the parts are in the position shown in Fig. 7. Fig. 9 is a diagrammatic view of the control mechanism when the tank has moved to its higher position. Fig. 10 is a diagrammatic view illustrating the action, when the tank is descending, of the dog for controlling the upward movement of the tank. Figs. 11 and 12 are sectional views taken in planes at right angles to each other through the three-way cock for controlling the admission and escape of air.

A tank 1 is submerged in a well, cistern, or reservoir. Near its lower end it is provided with an inlet-valve 2, which will automatically close to prevent the escape of water from the tank at this point. An outlet-pipe 3 connects with the tank near its bottom and leads up to near the top of the well, where it is connected by means of a flexible pipe 4 with the water-main 5. The water-main may extend to any point where it is desired to deliver water. An air-pipe 6 communicates with the top of the tank. A pipe 7, connected to the pipe 6, communicates through a flexible pipe 8 with the compressed-air-supply pipe 9, which may lead to a reservoir or any suitable source of air or gas under pressure. The pipe 6 is provided with a three-way cock 10, which may be set to establish communication between the source of compressed air and the tank or to permit air to exhaust from the tank through a vent 11 to the atmosphere. A crank-arm 12 is mounted on the cock. A link 13 is pivotally mounted on the platform covering the well. A pin 14 on the crank-arm 12 of the cock enters a slot 15 at the lower end of the link. The slot is elongated, so as to permit lost motion.

A rod 16 is connected to the top of the pipe 6 and extends upwardly through the platform. The rod is preferaby solid, though it may be a pipe. In the latter case of course the pipe must be closed at one end to prevent escape of air from the tank. A collar 17 is adjustably fixed on the rod 16 by means of a set-screw beneath the platform in order to limit the upward movement of the tank.

Mounted on the platform is a frame 18, in which the control mechanism is mounted. The frame comprises a flanged bottom plate and cored side plates connected at the top. It is preferably a single casting. The rod 16 extends centrally through the frame and is provided at its upper end with an adjustably-mounted collar 19, which may strike the top of the casting and limit the downward movement of the tank. Grooved rollers 20 21 are pivoted in the frame upon opposite sides of the rod and guide the same.

In a projection extending to one side of the frame a lever 22 is pivoted and provided with an adjustable weight or poise 23. A lever 24 is pivoted in the frame with its outer end bearing upon the free end of the weighted lever 22. The lever 24 is bifurcated at its inner end and provided with upwardly-extending ears. A dog 25 is pivoted in said ears between the bifurcations of the lever. The dog extends slightly beyond the inner end of the lever and is provided with lateral projections 26, which engage the lower side of the lever. The dog is also provided with a weighted arm 27, which holds the projections 26 normally against the lower side of the lever. It follows from this construction that when struck by an upwardly-moving body the dog and lever behave as if they were rigidly connected, while when engaged by a downwardly-moving body the dog alone will move and the resistance offered to the downwardly-moving body will be negligible.

Upon the side of the frame opposite to the projection a lever 28 is pivoted. Upon its outer end is an adjustable weight or poise 29 to hold it in its normal position. The inner end of the lever is bifurcated and provided with downwardly-extending ears 30, in which a dog 31 is pivoted. The dog 31 is provided with lateral projections 32, bearing upon the upper side of the lever, and extends inwardly beyond the inner end of the lever. It follows from this construction that when struck by a downwardly-moving body the dog 31 and lever 28 will behave as if they were rigidly connected, while when engaged by an upwardly-moving body the dog alone will move and the resistance offered to the upwardly-moving body will be negligible.

The rod 16, connected to the tank, is provided with two trip-collars, one, 33, above the guide-rollers 20 21, and the other, 34, below the guide-rollers. The two collars are frusto-conical in shape and taper toward each other. The upper one coöperates with the lever 22 and dog 25, while the lower one coöperates with the lever 28 and dog 31. A pipe 35 is arranged vertically in the bottom of the well and guides a stem 36, secured to the bottom of the tank.

The operation of the mechanism described is as follows: Consider the parts in the position shown in Figs. 1, 2, and 3. The tank 1 occupies its lowermost position and is full. The cock 10 is turned so as to establish communication with the source of compressed air, and thus put the water in the tank under pressure. The water in the tank may now be forced through the main. As water escapes from the tank it becomes lighter and is buoyed up by the water in the well. When the tank is only partially empty, it will tend to rise and will rise a short distance until the frusto-conical collar 33 on the rod 16 engages the dog 25 on the lever 24. The pin 14 on the crank-arm 12 of the cock will have moved to the upper end of the slot 15 in the link 13, as indicated in Fig. 8. The cock will not be turned, however, until the tank rises farther, and water will continue to be discharged from the tank as if no movement had occurred. The parts will be held in this position until the tank is emptied to such an extent that the buoyant force is sufficient to counterbalance the weight 23 on the lever 22. When this occurs, the inner end of the lever 24 will be raised and the tank will be permitted to rise rapidly until the stop-collar 17 strikes the platform. The position of the parts of the control mechanism when the trip-collar 33 is just passing out of engagement with the dog 25 is illustrated in Fig. 7, while the position of the parts when the tank is in its uppermost position is illustrated in Fig. 9. The final upward movement is accomplished quickly and suddenly and turns the cock 10, shutting off communication with the source of pressure and permitting the tank to exhaust through the vent 11 in the cock. The tank being relieved from pressure, water will flow from the well through the inlet-valve 2, and the tank will be refilled. As it fills the tank tends to sink and will sink until the trip-collar 34 strikes the dog 31 on the lever 28. The parts will be held in this position until the tank becomes heavy enough to counterbalance the weight 29 on the lever 28. When this occurs, the tank will rapidly descend until the stop-collar 19 strikes the top of the frame 18. During the descent of the tank the cock 10 will be turned and will open communication between the source of pressure and the interior of the tank. The water is again under pressure and will be forced through the main. This cycle of operations will be automatically performed as often as the tank is emptied.

Obviously the construction is capable of considerable modification within the scope of my invention, and therefore I do not wish to be limited to the specific construction shown and described.

What I claim as my invention, and desire to secure by Letters Patent, is—

1. A control mechanism for an automatic water-supply system which employs a vertically-movable member comprising a frame, a rod arranged to move with said vertically-movable member and provided with two projections, a lever pivotally mounted on said frame and having a bifurcated end adjacent to said rod, a dog pivotally mounted on said lever and projecting into the path of one of said projections of said rod, said dog having lateral projections resting on the upper side of the bifurcations of said lever, means to oppose downward movement of the end of said lever adjacent to said rod, a lever pivotally mounted on said frame and having a part projecting into the path of the other of said projections on said rod, and means to oppose upward movement of the end of said lever adjacent to said rod.

2. An automatic water-supply system comprising a vertically-movable submerged tank having means for admitting and discharging water and means for admitting and discharging air under pressure, a cock to control the supply of air under pressure provided with an arm, a platform, a link pivotally mounted on said platform and connected to said arm, a frame mounted on said platform, a rod connected with said tank to move therewith and extending through said frame, separated trip-collars on said rod, a lever pivotally mounted in said frame and provided with an adjustable poise, a second lever pivotally mounted on said frame bearing at one end on the free end of said first-mentioned lever and carrying at its opposite end a pivoted dog projecting into the path of the upper one of said trip-collars, and a lever pivotally mounted in said frame having on its outer end an adjustable poise and on its inner end a dog projecting into the path of the lower one of said trip-collars.

3. A control mechanism for an automatic water-supply system which employs a vertically-movable member, comprising a frame, a rod connected to said vertically-movable member and provided with two projections, a lever pivotally mounted on said frame and having a bifurcated inner end, a dog having lateral projections projecting over the bifurcations of said lever pivotally mounted on said lever and projecting into the path of one of said projections on said rod, means to resist downward movement of the inner end of said lever, a lever pivotally mounted on said frame and having a bifurcated inner end, a dog having lateral projections projecting under the bifurcations of said second-mentioned lever pivotally mounted on said second-mentioned lever and projecting into the path of the other of said projections on said rod, and means to resist upward movement of the inner end of said second-mentioned lever.

4. A control mechanism for an automatic water-supply system which employs a vertically-movable member, comprising a frame, a rod connected to said vertically-movable member, provided with two projections and passing through and guided by said frame, a lever pivoted in said frame and provided with an adjustable weight and having a pivoted dog in position to engage one of said projections, a lever pivoted on said frame and provided with a pivoted dog in position to engage the other of said projections, and a lever pivoted on said frame and having an adjustable weight on one end and engaging said second-mentioned lever at its other end, said dogs being arranged to move their respective levers in one direction and to move with respect to their respective levers in the other direction.

In testimony whereof I have signed my name to this specification, in the presence of two subscribing witnesses, this 20th day of October, 1904, at St. Louis, Missouri.

JOHN JOHNSON.

Witnesses:
   Wm. Wehrenbrecht,
   Fred F. Reisner.